United States Patent
Yamamoto et al.

(10) Patent No.: US 7,736,265 B2
(45) Date of Patent: Jun. 15, 2010

(54) POWER OUTPUT APPARATUS

(75) Inventors: Masaya Yamamoto, Kasugai (JP); Kiyoshiro Ueoka, Nisshin (JP); Kensuke Kamichi, Aichi-gun (JP); Kazuomi Okasaka, Nagoya (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 434 days.

(21) Appl. No.: 11/793,403

(22) PCT Filed: Dec. 28, 2005

(86) PCT No.: PCT/JP2005/024106

§ 371 (c)(1), (2), (4) Date: Jun. 18, 2007

(87) PCT Pub. No.: WO2006/070880

PCT Pub. Date: Jul. 6, 2006

(65) Prior Publication Data

US 2008/0300099 A1    Dec. 4, 2008

(30) Foreign Application Priority Data

Dec. 28, 2004   (JP) .............................. 2004-380025

(51) Int. Cl.
*B60K 1/02*   (2006.01)
*B60W 10/04*   (2006.01)

(52) U.S. Cl. ................................ 477/3; 180/65.285

(58) Field of Classification Search ............. 477/3; 80/65.265, 65.275, 65.285
See application file for complete search history.

(56) References Cited

U.S. PATENT DOCUMENTS

| | | | |
|---|---|---|---|
| 6,441,574 B1* | 8/2002 | Phillips et al. | 318/432 |
| 6,634,986 B2* | 10/2003 | Kima | 477/107 |
| 2005/0029024 A1* | 2/2005 | Takami et al. | 180/65.3 |
| 2005/0054479 A1* | 3/2005 | Masterson et al. | 477/3 |
| 2005/0288147 A1 | 12/2005 | Endo et al. | |

FOREIGN PATENT DOCUMENTS

| | | |
|---|---|---|
| JP | 2004-203220 | 7/2004 |
| JP | 2004-204957 | 7/2004 |
| JP | 2004-357459 | 12/2004 |

* cited by examiner

*Primary Examiner*—Roger Pang
(74) *Attorney, Agent, or Firm*—Oliff & Berridge, PLC

(57) ABSTRACT

In the presence of a torque change request (step S170) for changing a torque Tm2 of one motor MG2 to enable a smooth gearshift of a transmission interposed between a motor and a driveshaft, when the change of the torque Tm2 is unattainable within the range of an input limit Win and an output limit Wout of a battery (step S200), the power output apparatus of the invention resets a torque command Tm1* of the other motor MG1 to be within the input limit Win and the output limit Wout of the battery (steps S210 and S250). The power output apparatus also resets an engine power demand Pe* to make a rotation speed Ne of an engine approximately equal to a target rotation speed Ne* (steps S230 and S270). This arrangement ensures a smooth gearshift of the transmission.

14 Claims, 12 Drawing Sheets

POWER OUTPUT APPARATUS

TECHNICAL FIELD

The present invention relates to a power output apparatus, a motor vehicle equipped with the power output apparatus, a control system for the power output apparatus, and the control method of the power output apparatus.

BACKGROUND ART

In one proposed configuration of the power output apparatus, three rotational elements of a planetary gear unit are respectively connected to a crankshaft of an engine, a rotating shaft of a generator, and a driveshaft linked with an axle (see, for example, Patent Reference 1). A motor is linked to the driveshaft via a transmission. This power output apparatus corrects the engine output and the torque of the generator to assure a desired level of output torque, which is to be output to the driveshaft, during speed change of the transmission.

Patent Reference 1: Japanese Patent Laid-Open Gazette No. 2004-203220

DISCLOSURE OF THE INVENTION

The power output apparatus generally includes a secondary battery or another accumulator unit that transmits electric power to and from the motor and the generator. Restriction of the input and output of electric power from and to the accumulator unit, for example, in a cold state may interfere with a smooth gearshift of the transmission. The engine output and the torque of the generator may be corrected to assure the desired level of output torque, which is to be output to the driveshaft, under the restriction of the input and output of electric power from and to the accumulator unit. Such correction may, however, make the level of electric power input to or output from the accumulator unit beyond the input limit or the output limit. The gearshift of the transmission in disregard of the input limit and output limit of the accumulator unit undesirably causes the accumulator unit from being overcharged with excess electric power or from being over-discharged to supply excess electric power. The gearshift of the transmission within the input limit and the output limit of the accumulator unit, however, does not ensure the desired level of output torque, which is to be output to the driveshaft.

In the power output apparatus of the invention, the motor vehicle equipped with the power output apparatus, the control system for the power output apparatus, and the control method of the power output apparatus, there is a requirement for enabling a smooth gearshift of a transmission even under restriction of input and output of a secondary battery or another accumulator unit. In the power output apparatus of the invention, the motor vehicle equipped with the power output apparatus, the control system for the power output apparatus, and the control method of the power output apparatus, there is also a requirement for ensuring output of a specific power equivalent to a power demand to a driveshaft at a gearshift timing of a transmission even under restriction of input and output of a secondary battery or another accumulator unit.

In order to satisfy at least part of the above and the other related requirements, the power output apparatus of the invention, the motor vehicle equipped with the power output apparatus, the control system for the power output apparatus, and the control method of the power output apparatus have the configurations discussed below.

The present invention is directed to a power output apparatus that outputs power to a driveshaft. The power output apparatus includes: an internal combustion engine; an electric power-mechanical power input output structure that is connected to an output shaft of the internal combustion engine and to the driveshaft and outputs at least part of output power of the internal combustion engine to the driveshaft through input and output of electric power and mechanical power; a motor that inputs and outputs power; a transmission mechanism that transmits power between a rotating shaft of the motor and the driveshaft with a changeover of a change gear ratio; an accumulator unit that inputs and outputs electric power from and to the electric power-mechanical power input output structure and the motor; a power demand setting module that sets a power demand to be output to the driveshaft; and a control module that attains the changeover of the change gear ratio of the transmission mechanism with corrective change of the output power of the motor. Under a non-restricted change condition where the corrective change of the output power of the motor is attainable within an input limit and an output limit of the accumulator unit in the course of output of a certain power equivalent to the set power demand to the driveshaft, the control module controls the internal combustion engine, the electric power-mechanical power input output structure, the motor, and the transmission mechanism to change over the change gear ratio of the transmission mechanism with correctively changing the output power of the motor and to ensure output of the certain power equivalent to the set power demand to the driveshaft. Under a restricted change condition where the corrective change of the output power of the motor is unattainable within the input limit and the output limit of the accumulator unit in the course of output of the certain power equivalent to the set power demand to the driveshaft, the control module adjusts the input and the output of electric power by the electric power-mechanical power input output structure and controls the internal combustion engine, the electric power-mechanical power input output structure, the motor, and the transmission mechanism to change over the change gear ratio of the transmission mechanism with correctively changing the output power of the motor within the input limit and the output limit of the accumulator unit and to ensure output of the certain power equivalent to the set power demand to the driveshaft.

In the power output apparatus of the invention, the transmission mechanism works to transmit the power between the rotating shaft of the motor and the driveshaft with the changeover of the change gear ratio. The changeover of the change gear ratio of the transmission mechanism is attained with the corrective change of the output power of the motor. In the non-restricted change condition, the corrective change of the output power of the motor is attainable within the input limit and the output limit of the accumulator unit, which transmits electric power to and from the electric power-mechanical power input output structure and the motor, in the course of output of the certain power equivalent to the power demand, which is required for the driveshaft, to the driveshaft. Under this non-restricted change condition, the power output apparatus of the invention controls the internal combustion engine, the electric power-mechanical power input output structure, the motor, and the transmission mechanism to change over the change gear ratio of the transmission mechanism with correctively changing the output power of the motor and to ensure output of the certain power equivalent to the power demand to the driveshaft. In the restricted change condition, on the other hand, the corrective change of the output power of the motor is unattainable within the input limit and the output limit of the accumulator unit in the course of output of the certain power equivalent to the power demand to the driveshaft. Under this restricted change condition, the power output apparatus of the invention adjusts the input and the output of electric power by the electric power-mechanical power input output structure and controls the internal combustion engine, the electric power-mechanical power input output structure, the motor, and the transmission mechanism to change over the change gear ratio of the transmission mechanism with correctively changing the output power of the motor within the input limit and the output limit of the accumulator unit and to ensure output of the certain power equivalent to the power demand to the driveshaft. This arrangement enables a smooth changeover of the change gear ratio of the transmission mechanism and ensures output of the power equivalent to the power demand to the driveshaft, even in the restricted change condition where the corrective change of the output power of the motor is unattainable within the input limit and the output limit of the accumulator unit in the course of output of the certain power equivalent to the power demand to the driveshaft. In the power output apparatus of the invention, the transmission mechanism may be a multi-speed transmission having at least two different reduction gear ratios as speeds.

In one aspect of the invention, the power output apparatus further has a target mechanical power setting module that sets a target mechanical power to be output from the internal combustion engine, based on the set power demand. Under the non-restricted change condition, the control module controls the internal combustion engine to output a specific mechanical power equivalent to the set target mechanical power. Under the restricted change condition, the control module controls the internal combustion engine to output an adjusted mechanical power with a corrective change of the set target mechanical power to be within the input limit and the output limit of the accumulator unit. In the restricted change condition, the target mechanical power to be output from the internal combustion engine is changed to be within the input limit and the output limit of the accumulator unit. Such control ensures a smooth changeover of the change gear ratio of the transmission mechanism. In one preferable embodiment of the power output apparatus having this arrangement, under the restricted change condition, the control module controls the internal combustion engine with a change in torque. In another preferable embodiment of the power output apparatus having this arrangement, the control module controls the internal combustion engine with a change in rotation speed.

In another aspect of the invention, the power output apparatus further has a target power setting module that sets a target power to be output from the internal combustion engine, based on the set power demand. Under the non-restricted change condition, the control module controls the internal combustion engine to output a specific power equivalent to the set target power. Under the restricted change condition, the control module controls the internal combustion engine to output an adjusted power equivalent to the set target power within the input limit and the output limit of the accumulator unit, accompanied with a change in rotation speed of the internal combustion engine. In the restricted change condition, the target power to be output from the internal combustion engine is changed to be within the input limit and the output limit of the accumulator unit. Such control ensures a smooth changeover of the change gear ratio of the transmission mechanism. In one preferable embodiment of the power output apparatus of this aspect, under the restricted change condition, before a rotation speed of the internal combustion engine approaches to and reaches a target rotation speed determined according to the set target power, the control module controls the internal combustion engine to output the adjusted power equivalent to the set target power within the input limit and the output limit of the accumulator unit, accompanied with a change in rotation speed of the internal combustion engine. After the rotation speed of the internal combustion engine reaches the target rotation speed determined according to the set target power, the control module updates the set target power to be within the input limit and the output limit of the accumulator and controls the internal combustion engine to output a corrective power equivalent to the updated target power. This arrangement desirably reduces a change rate of the target power at the timing of a changeover of the change gear ratio of the transmission mechanism and thereby ensures smooth output of the required power after the changeover of the change gear ratio.

In the power output apparatus of the invention, the control module controls the electric power-mechanical power input output structure to decrease a torque toward a value '0', when the corrective change of the output power of the motor under the restricted change condition is correction of a torque of the motor toward a value '0'. In one preferable embodiment of the power output apparatus of this aspect, the control module controls the internal combustion engine with an increase in rotation speed, when the corrective change of the output power of the motor under the restricted change condition is correction of the torque of the motor toward the value '0'.

In the power output apparatus of the invention, the electric power-mechanical power input output structure includes a three shaft-type power input output mechanism that is linked to three shafts, the output shaft of the internal combustion engine, the driveshaft, and a third shaft, and inputs and outputs power from and to a residual one shaft based on powers input from and output to any two shafts among the three shafts; and a generator that inputs and outputs power from and to the third shaft. The electric power-mechanical power input output structure may include a pair-rotor motor that has a first rotor connected to the output shaft of the internal combustion engine and a second rotor connected to the driveshaft and is driven to output at least part of the output power of the internal combustion engine to the driveshaft through input and output of electric power by electromagnetic interaction of the first rotor with the second rotor.

The present invention is also directed to a motor vehicle equipped with the power output apparatus having any of the arrangements discussed above and outputting power to a driveshaft, and has an axle linked to the driveshaft. The power output apparatus basically includes: an internal combustion engine; an electric power-mechanical power input output structure that is connected to an output shaft of the internal combustion engine and to the driveshaft and outputs at least part of output power of the internal combustion engine to the driveshaft through input and output of electric power and mechanical power; a motor that inputs and outputs power; a transmission mechanism that transmits power between a rotating shaft of the motor and the driveshaft with a changeover of a change gear ratio; an accumulator unit that inputs and outputs electric power from and to the electric power-mechanical power input output structure and the motor; a power demand setting module that sets a power demand to be output to the driveshaft; and a control module that attains the changeover of the change gear ratio of the transmission mechanism with corrective change of the output power of the motor. Under a non-restricted change condition where the corrective change of the output power of the motor is attainable within an input limit and an output limit of the accumulator unit in the course of output of a certain power equivalent to the set power demand to the driveshaft, the control module controls the internal combustion engine, the electric power-mechanical power input output structure, the motor, and the transmission mechanism to change over the change gear ratio of the transmission mechanism with correctively changing the output power of the motor and to ensure output of the certain power equivalent to the set power demand to the driveshaft. Under a restricted change condition where the corrective change of the output power of the motor is unattainable within the input limit and the output limit of the accumulator unit in the course of output of the certain power equivalent to the set power demand to the driveshaft, the control module adjusts the input and the output of electric power by the electric power-mechanical power input output structure and controls the internal combustion engine, the electric power-mechanical power input output structure, the motor, and the transmission mechanism to change over the change gear ratio of the transmission mechanism with correctively changing the output power of the motor within the input limit and the output limit of the accumulator unit and to ensure output of the certain power equivalent to the set power demand to the driveshaft.

The motor vehicle of the invention is equipped with the power output apparatus having any of the arrangements described above and accordingly exerts the similar effects to those of the power output apparatus of the invention. For example, this arrangement enables a smooth changeover of the change gear ratio of the transmission mechanism and ensures output of the power equivalent to the power demand to the driveshaft, even in the restricted change condition where the corrective change of the output power of the motor is unattainable within the input limit and the output limit of the accumulator unit in the course of output of the certain power equivalent to the power demand to the driveshaft.

The present invention is also directed to a control system for a power output apparatus. The power output apparatus includes: an internal combustion engine; an electric power-mechanical power input output structure that is connected to an output shaft of the internal combustion engine and to a driveshaft and outputs at least part of output power of the internal combustion engine to the driveshaft through input and output of electric power and mechanical power; a motor that inputs and outputs power; a transmission mechanism that transmits power between a rotating shaft of the motor and the driveshaft with a changeover of a change gear ratio; and an accumulator unit that inputs and outputs electric power from and to the electric power-mechanical power input output structure and the motor. The control system includes: a power demand setting module that sets a power demand to be output to the driveshaft; and a control module that attains the changeover of the change gear ratio of the transmission mechanism with corrective change of the output power of the motor. Under a non-restricted change condition where the corrective change of the output power of the motor is attainable within an input limit and an output limit of the accumulator unit in the course of output of a certain power equivalent to the set power demand to the driveshaft, the control module controls the internal combustion engine, the electric power-mechanical power input output structure, the motor, and the transmission mechanism to change over the change gear ratio of the transmission mechanism with correctively changing the output power of the motor and to ensure output of the certain power equivalent to the set power demand to the driveshaft. Under a restricted change condition where the corrective change of the output power of the motor is unattainable within the input limit and the output limit of the accumulator unit in the course of output of the certain power equivalent to the set power demand to the driveshaft, the control module adjusts the input and the output of electric power by the electric power-mechanical power input output structure and controls the internal combustion engine, the electric power-mechanical power input output structure, the motor, and the transmission mechanism to change over the change gear ratio of the transmission mechanism with correctively changing the output power of the motor within the input limit and the output limit of the accumulator unit and to ensure output of the certain power equivalent to the set power demand to the driveshaft.

In the control system for the power output apparatus of the invention, the transmission mechanism works to transmit the power between the rotating shaft of the motor and the driveshaft with the changeover of the change gear ratio. The changeover of the change gear ratio of the transmission mechanism is attained with the corrective change of the output power of the motor. In the non-restricted change condition, the corrective change of the output power of the motor is attainable within the input limit and the output limit of the accumulator unit, which transmits electric power to and from the electric power-mechanical power input output structure and the motor, in the course of output of the certain power equivalent to the power demand, which is required for the driveshaft, to the driveshaft. Under this non-restricted change condition, the power output apparatus of the invention controls the internal combustion engine, the electric power-mechanical power input output structure, the motor, and the transmission mechanism to change over the change gear ratio of the transmission mechanism with correctively changing the output power of the motor and to ensure output of the certain power equivalent to the power demand to the driveshaft. In the restricted change condition, on the other hand, the corrective change of the output power of the motor is unattainable within the input limit and the output limit of the accumulator unit in the course of output of the certain power equivalent to the power demand to the driveshaft. Under this restricted change condition, the power output apparatus of the invention adjusts the input and the output of electric power by the electric power-mechanical power input output structure and controls the internal combustion engine, the electric power-mechanical power input output structure, the motor, and the transmission mechanism to change over the change gear ratio of the transmission mechanism with correctively changing the output power of the motor within the input limit and the output limit of the accumulator unit and to ensure output of the certain power equivalent to the power demand to the driveshaft. This arrangement enables a smooth changeover of the change gear ratio of the transmission mechanism and ensures output of the power equivalent to the power demand to the driveshaft, even in the restricted change condition where the corrective change of the output power of the motor is unattainable within the input limit and the output limit of the accumulator unit in the course of output of the certain power equivalent to the power demand to the driveshaft.

The present invention is also directed to a control method of a power output apparatus. The power output apparatus includes: an internal combustion engine; an electric power-mechanical power input output structure that is connected to an output shaft of the internal combustion engine and to a driveshaft and outputs at least part of output power of the internal combustion engine to the driveshaft through input and output of electric power and mechanical power; a motor that inputs and outputs power; a transmission mechanism that transmits power between a rotating shaft of the motor and the driveshaft with a changeover of a change gear ratio; and an accumulator unit that inputs and outputs electric power from and to the electric power-mechanical power input output structure and the motor. The control method attains the changeover of the change gear ratio of the transmission mechanism with corrective change of the output power of the motor. Under a non-restricted change condition where the corrective change of the output power of the motor is attainable within an input limit and an output limit of the accumulator unit in the course of output of a certain power equivalent to a power demand, which is required for the driveshaft, to the driveshaft, the control method controls the internal combustion engine, the electric power-mechanical power input output structure, the motor, and the transmission mechanism to change over the change gear ratio of the transmission mechanism with correctively changing the output power of the motor and to ensure output of the certain power equivalent to the power demand to the driveshaft. Under a restricted change condition where the corrective change of the output power of the motor is unattainable within the input limit and the output limit of the accumulator unit in the course of output of the certain power equivalent to the power demand to the driveshaft, the control method adjusts the input and the output of electric power by the electric power-mechanical power input output structure and controls the internal combustion engine, the electric power-mechanical power input output structure, the motor, and the transmission mechanism to change over the change gear ratio of the transmission mechanism with correctively changing the output power of the motor within the input limit and the output limit of the accumulator unit and to ensure output of the certain power equivalent to the power demand to the driveshaft.

In the control method of the power output apparatus of the invention, the transmission mechanism works to transmit the power between the rotating shaft of the motor and the driveshaft with the changeover of the change gear ratio. The changeover of the change gear ratio of the transmission mechanism is attained with the corrective change of the output power of the motor. In the non-restricted change condition, the corrective change of the output power of the motor is attainable within the input limit and the output limit of the accumulator unit, which transmits electric power to and from the electric power-mechanical power input output structure and the motor, in the course of output of the certain power equivalent to the power demand, which is required for the driveshaft, to the driveshaft. Under this non-restricted change condition, the power output apparatus of the invention controls the internal combustion engine, the electric power-mechanical power input output structure, the motor, and the transmission mechanism to change over the change gear ratio of the transmission mechanism with correctively changing the output power of the motor and to ensure output of the certain power equivalent to the power demand to the driveshaft. In the restricted change condition, on the other hand, the corrective change of the output power of the motor is unattainable within the input limit and the output limit of the accumulator unit in the course of output of the certain power equivalent to the power demand to the driveshaft. Under this restricted change condition, the power output apparatus of the invention adjusts the input and the output of electric power by the electric power-mechanical power input output structure and controls the internal combustion engine, the electric power-mechanical power input output structure, the motor, and the transmission mechanism to change over the change gear ratio of the transmission mechanism with correctively changing the output power of the motor within the input limit and the output limit of the accumulator unit and to ensure output of the certain power equivalent to the power demand to the driveshaft. This arrangement enables a smooth changeover of the change gear ratio of the transmission mechanism and ensures output of the power equivalent to the power demand to the driveshaft, even in the restricted change condition where the corrective change of the output power of the motor is unattainable within the input limit and the output limit of the accumulator unit in the course of output of the certain power equivalent to the power demand to the driveshaft.

BEST MODES OF CARRYING OUT THE INVENTION

Figure 1:
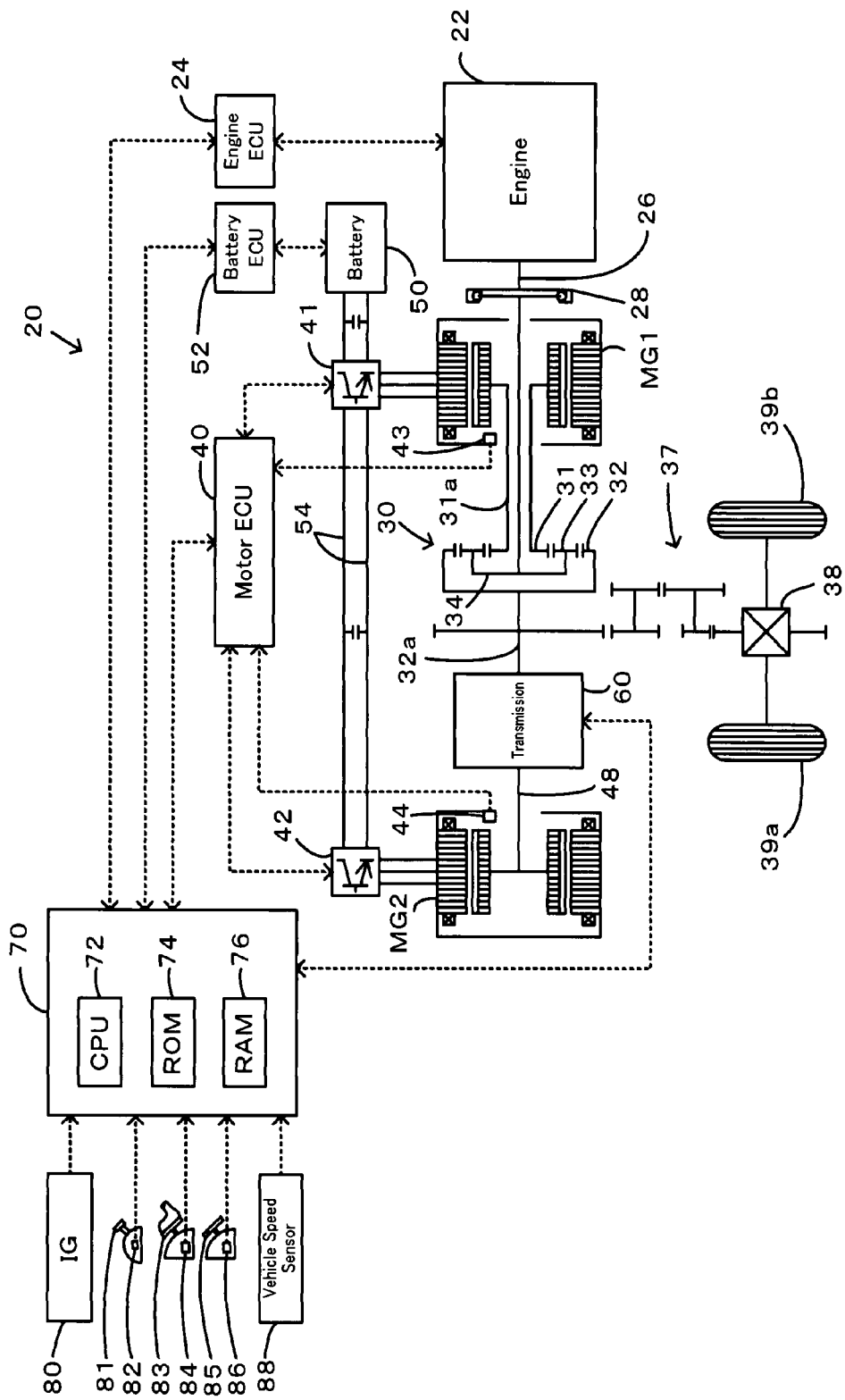
FIG. 1 schematically illustrates the configuration of a hybrid vehicle equipped with a power output apparatus in one embodiment of the invention.

One mode of carrying out the invention is discussed below as a preferred embodiment with reference to the accompanied drawings. FIG. 1 schematically illustrates the configuration of a hybrid vehicle 20 equipped with a power output apparatus in one embodiment of the invention. As illustrated, the hybrid vehicle 20 of the embodiment includes an engine 22, a three shaft-type power distribution integration mechanism 30 that is linked to a crankshaft 26 or an output shaft of the engine 22 via a damper 28, a motor MG1 that is connected to the power distribution integration mechanism 30 and has power generation capability, a motor MG2 that is linked to the power distribution integration mechanism 30 via a transmission 60, and a hybrid electronic control unit 70 that controls the whole driving system of the hybrid vehicle 20.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution integration mechanism 30 includes a sun gear 31 as an external gear, a ring gear 32 as an internal gear arranged concentrically with the sun gear 31, multiple pinion gears 33 engaging with the sun gear 31 and with the ring gear 32, and a carrier 34 holding the multiple pinion gears 33 to allow both their revolutions and their rotations on their axes. The power distribution integration mechanism 30 is thus constructed as a planetary gear mechanism including the sun gear 31, the ring gear 32, and the carrier 34 as rotational elements of differential motions. The carrier 34, the sun gear 31, and the ring gear 32 of the power distribution integration mechanism 30 are respectively linked to the crankshaft 26 of the engine 22, to the motor MG1, and to the motor MG2 via the transmission 60. When the motor MG1 functions as a generator, the power of the engine 22 input via the carrier 34 is distributed into the sun gear 31 and the ring gear 32 corresponding to their gear ratio. When the motor MG1 functions as a motor, on the other hand, the power of the engine 22 input via the carrier 34 is integrated with the power of the motor MG1 input via the sun gear 31 and is output to the ring gear 32. The ring gear 32 is mechanically connected to front drive wheels 39$a$ and 39$b$ of the hybrid vehicle 20 via a gear mechanism 37 and a differential gear 38. The power output to the ring gear 32 is thus transmitted to the drive wheels 39$a$ and 39$b$ via the gear mechanism 37 and the differential gear 38. In the driving system of the hybrid vehicle 20, the power distribution integration mechanism 30 is linked to three shafts, that is, the crankshaft 26 or the output shaft of the engine 22 connected with the carrier 34, a sun gear shaft 31$a$ or a rotating shaft of the motor MG1 connected with the sun gear 31, and a ring gear shaft 32$a$ or a driveshaft connected with the ring gear 32 and mechanically linked to the drive wheels 39$a$ and 39$b$.

The motors MG1 and MG2 are constructed as known synchronous motor generators that may be actuated both as a generator and as a motor. The motors MG1 and MG2 transmit electric powers to and from a battery 50 via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged upon the balance of the input and output of electric powers between the motors MG1 and MG2. Both the motors MG1 and MG2 are driven and controlled by a motor electronic control unit 40 (hereafter referred to as motor ECU 40). The motor ECU 40 inputs signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42.

The motor ECU 40 executes a rotation speed computation routine (not shown) to calculate rotation speeds Nm1 and Nm2 of the rotors in the motors MG1 and MG2 from the input signals from the rotational position detection sensors 43 and 44. The motor ECU 40 establishes communication with the hybrid electronic control unit 70 to drive and control the motors MG1 and MG2 in response to control signals received from the hybrid electronic control unit 70 and to output data regarding the operating conditions of the motors MG1 and MG2 to the hybrid electronic control unit 70 according to the requirements.

Figure 2:
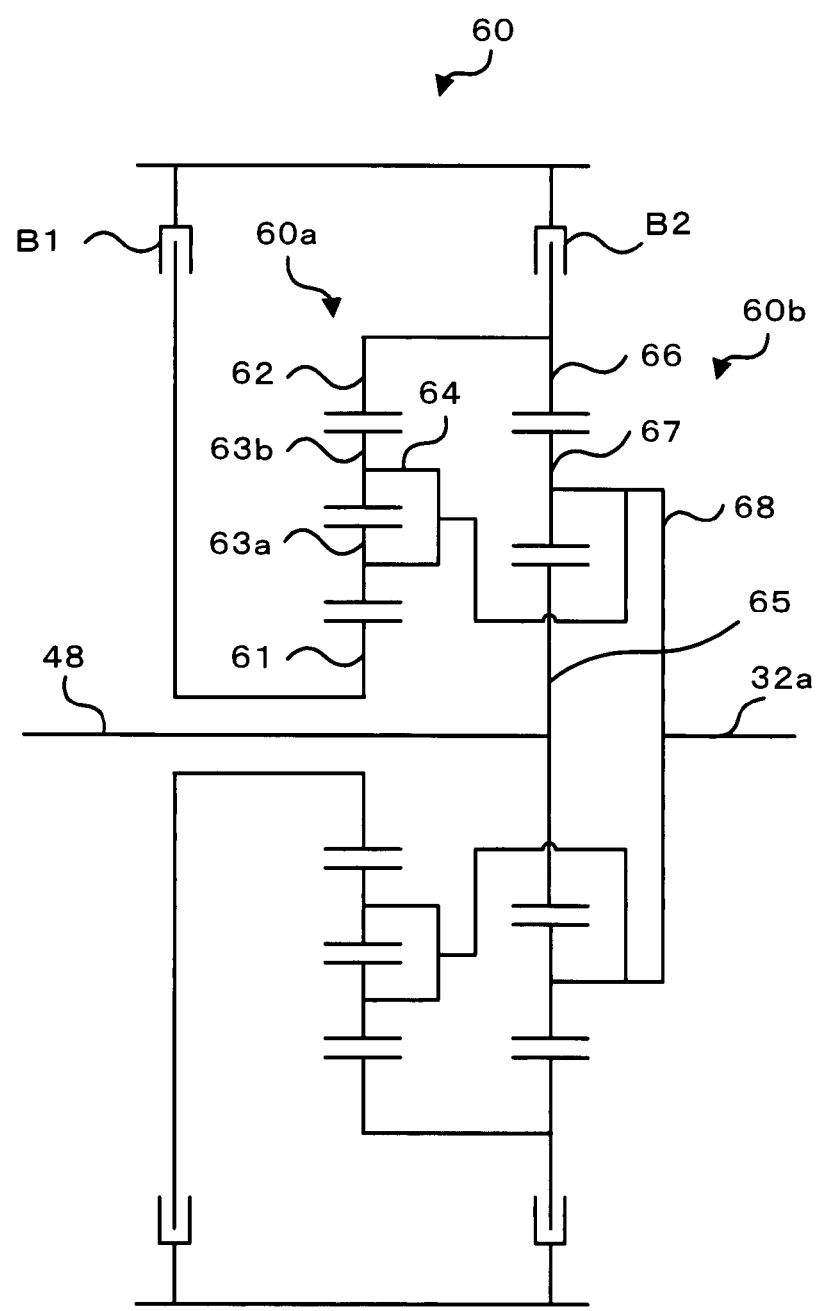
FIG. 2 shows the structure of a transmission mounted on the hybrid vehicle of the embodiment.

The transmission 60 functions to connect and disconnect a rotating shaft 48 of the motor MG2 with and from the ring gear shaft 32$a$. In the connection state, the transmission 60 reduces the rotation speed of the rotating shaft 48 of the motor MG2 at two different reduction gear ratios and transmits the reduced rotation speed to the ring gear shaft 32$a$. One typical structure of the transmission 60 is shown in FIG. 2. The transmission 60 shown in FIG. 2 has a double-pinion planetary gear mechanism 60$a$, a single-pinion planetary gear mechanism 60$b$, and two brakes B1 and B2. The double-pinion planetary gear mechanism 60$a$ includes a sun gear 61 as an external gear, a ring gear 62 as an internal gear arranged concentrically with the sun gear 61, multiple first pinion gear 63$a$ engaging with the sun gear 61, multiple second pinion gears 63$b$ engaging with the multiple first pinion gears 63$a$ and with the ring gear 62, and a carrier 64 coupling the multiple first pinion gears 63$a$ with the multiple second pinion gears 63$b$ to allow both their revolutions and their rotations on their axes. The engagement and the release of the brake B1 stop and allow the rotation of the sun gear 61. The single-pinion planetary gear mechanism 60$b$ includes a sun gear 65 as an external gear, a ring gear 66 as an internal gear arranged concentrically with the sun gear 65, multiple pinion gears 67 engaging with the sun gear 65 and with the ring gear 66, and a carrier 68 holding the multiple pinion gears 67 to allow both their revolutions and their rotations on their axes. The sun gear 65 and the carrier 68 of the single-pinion planetary gear mechanism 60$b$ are respectively connected to the rotating shaft 48 of the motor MG2 and to the ring gear shaft 32$a$. The engagement and the release of the brake B2 stop and allow the rotation of the ring gear 66. The double-pinion planetary gear mechanism 60$a$ and the single-pinion planetary gear mechanism 60$b$ are coupled with each other via linkage of the respective ring gears 62 and 66 and linkage of the respective carriers 64 and 68. In the transmission 60, the combination of the released brakes B1 and B2 disconnects the rotating shaft 48 of the motor MG2 from the ring gear shaft 32$a$. The combination of the released brake B1 and the engaged brake B2 reduces the rotation of the rotating shaft 48 of the motor MG2 at a relatively large reduction gear ratio and transmits the largely reduced rotation to the ring gear shaft 32$a$. This state is hereafter expressed as Lo gear position, and the reduction gear ratio in this state is represented by Glo. The combination of the engaged brake B1 and the released brake B2 reduces the rotation of the rotating shaft 48 of the motor MG2 at a relatively small reduction gear ratio and transmits the slightly reduced rotation to the ring gear shaft 32$a$. This state is hereafter expressed as Hi gear position, and the reduction gear ratio in this state is represented by Ghi. The combination of the engaged brakes B1 and B2 prohibits the rotations of the rotating shaft 48 and the ring gear shaft 32$a$.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature measured by a temperature sensor (not shown) attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 88. The hybrid electronic control unit 70 outputs, via its output port, driving signals to actuators (not shown) to regulate the brakes B1 and B2 in the transmission 60. The hybrid electronic control unit 70 establishes communication with the engine ECU 24, the motor ECU 40, and the battery ECU 52 via its communication port to receive and send the diversity of control signals and data from and to the engine ECU 24, the motor ECU 40, and the battery ECU 52, as mentioned above.

The hybrid vehicle 20 of the embodiment thus constructed calculates a torque demand to be output to the ring gear shaft 32$a$ functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32$a$. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32$a$. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32$a$, simultaneously with charge or discharge of the battery 50. The motor drive mode stops the operations of the engine 22 and drives and controls the motor MG2 to output a quantity of power equivalent to the required level of power to the ring gear shaft 32$a$.

Figure 3:
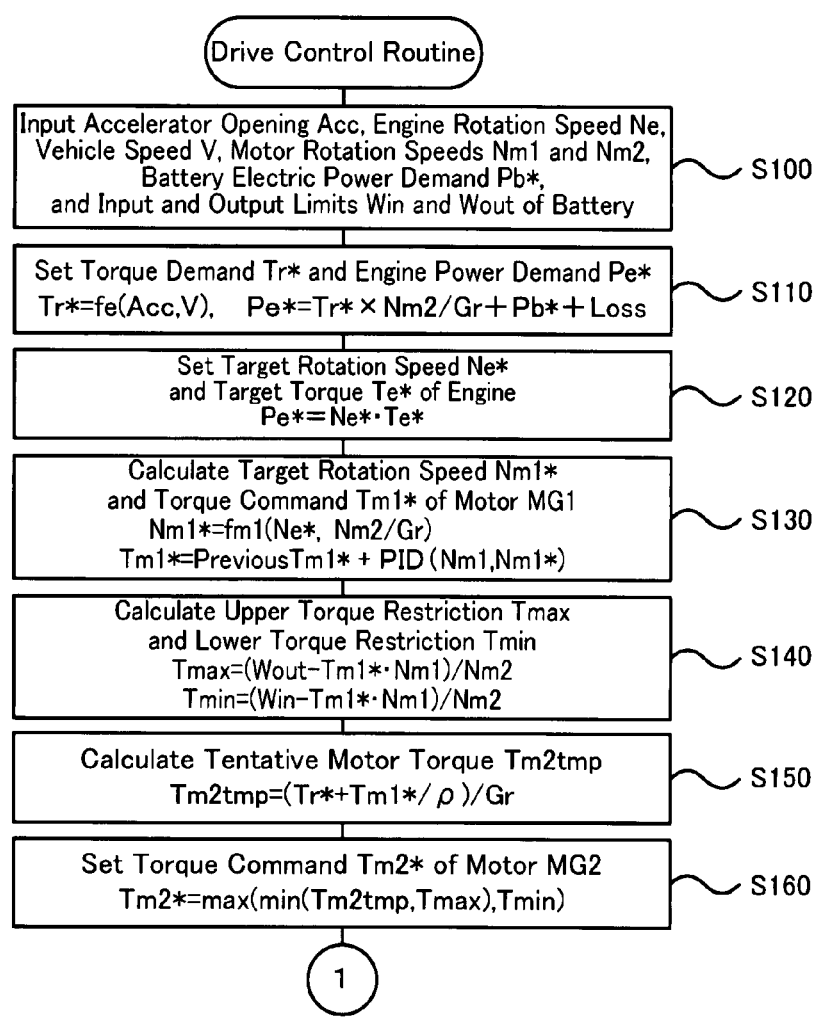
FIG. 3 is a flowchart showing a first half of a drive control routine executed by a hybrid electronic control unit mounted on the hybrid vehicle of the embodiment.
Figure 4:
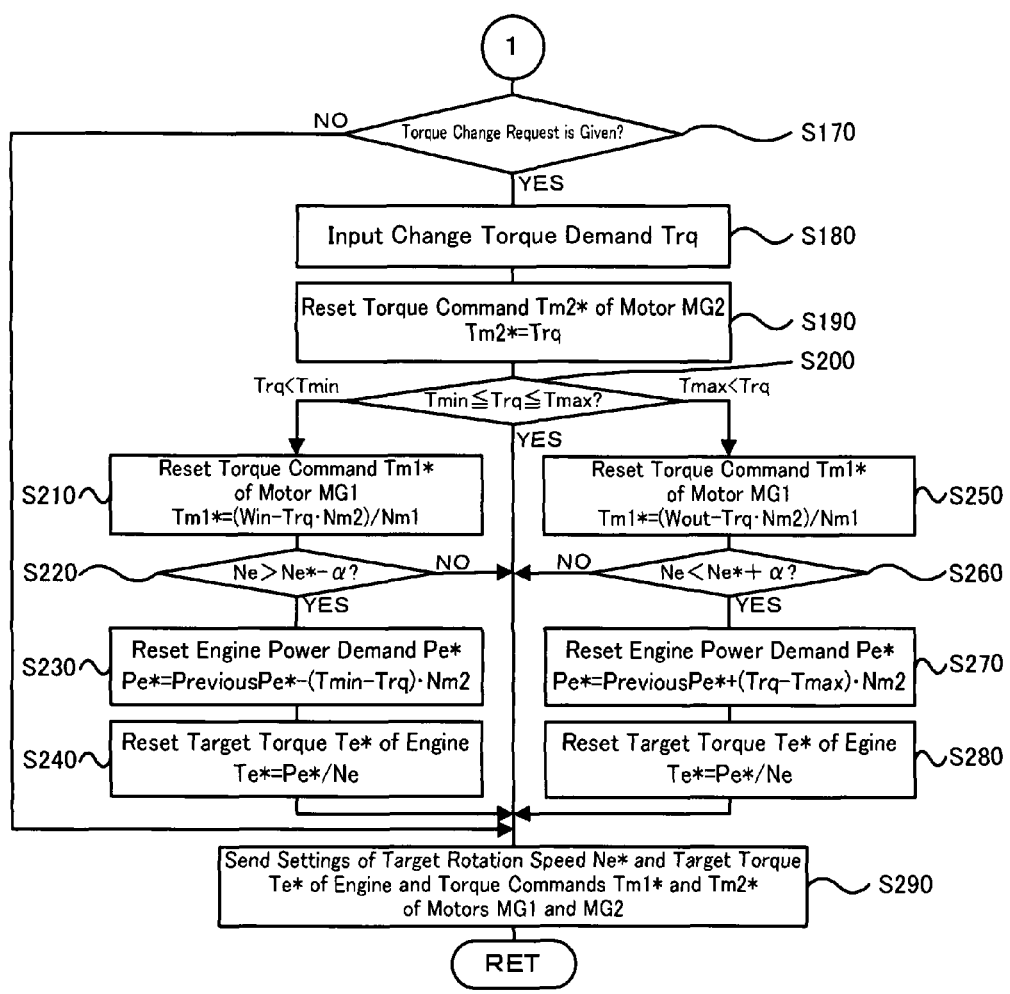
FIG. 4 is a flowchart showing a latter half of the drive control routine executed by the hybrid electronic control unit.

The description regards the operations of the hybrid vehicle 20 of the embodiment having the configuration discussed above, especially a series of operation control to attain a gearshift of the transmission 60 with a change in torque Tm2 of the motor MG2. FIGS. 3 and 4 are flowcharts showing a drive control routine executed by the hybrid electronic control unit 70 in the hybrid vehicle 20 of the embodiment. This drive control routine is performed repeatedly at preset time intervals, for example, at every several msec.

Figure 5:
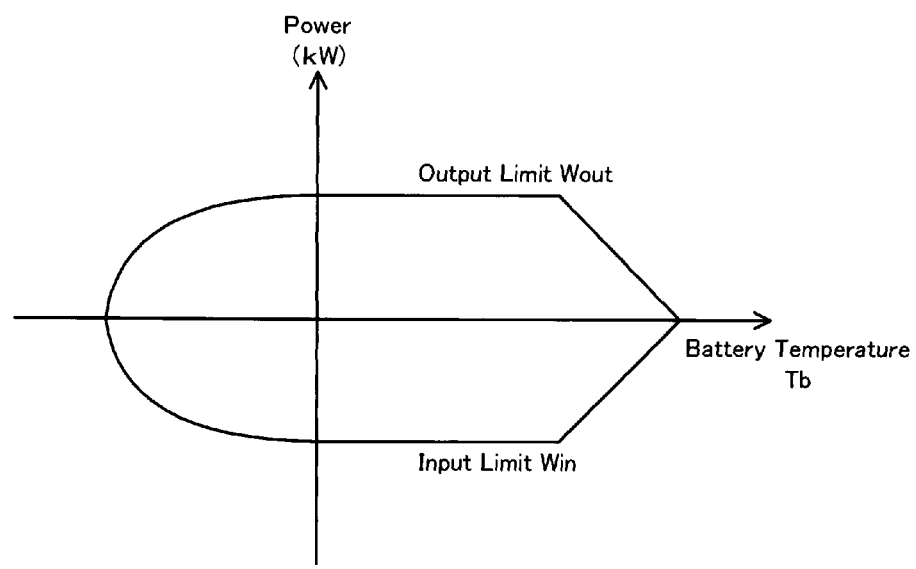
FIG. 5 shows variations of an input limit Win and an output limit Wout of a battery against battery temperature Tb.
Figure 6:
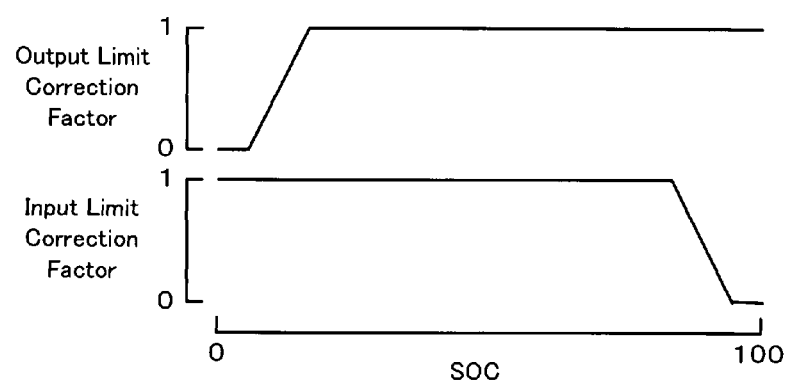
FIG. 6 shows variations of an input limit correction factor and an output limit correction factor against the state of charge SOC of the battery.

In the drive control routine, the CPU 72 of the hybrid electronic control unit 70 first inputs various data required for control, that is, the accelerator opening Acc from the accelerator pedal position sensor 84, the vehicle speed V from the vehicle speed sensor 88, a rotation speed Ne of the engine 22, rotation speeds Nm1 and Nm2 of the motors MG1 and MG2, a battery electric power demand Pb*, and an input limit Win and an output limit Wout of the battery 50 (step S100). The rotation speed Ne of the engine 22 is computed from a signal representing a crank position detected by a crank position sensor (not shown) attached to the crankshaft 26 and is received from the engine ECU 24 by communication. The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The batter electric power demand Pb* is set based on a remaining charge or current state of charge (SOC) of the battery 50, as a level of electric power to charge the battery 50 or to be discharged from the battery 50 by the battery ECU 52, and is received from the battery ECU 52 via communication. The input limit Win and the output limit Wout of the battery 50 are set based on the battery temperature Tb and the state of charge SOC of the battery 50. A concrete procedure of setting the input and output limits Win and Wout of the battery 50 sets base values of the input limit Win and the output limit Wout corresponding to the battery temperature Tb, specifies an input limit correction factor and an output limit correction factor corresponding to the state of charge SOC of the battery 50, and multiplies the base values of the input limit Win and the output limit Wout by the specified input limit correction factor and output limit correction factor to determine the input limit Win and the output limit Wout of the battery 50. FIG. 5 shows variations of the input limit Win and the output limit Wout against the battery temperature Tb. FIG. 6 shows variations of the input limit correction factor and the output limit correction factor against the state of charge SOC of the battery 50.

Figure 7:
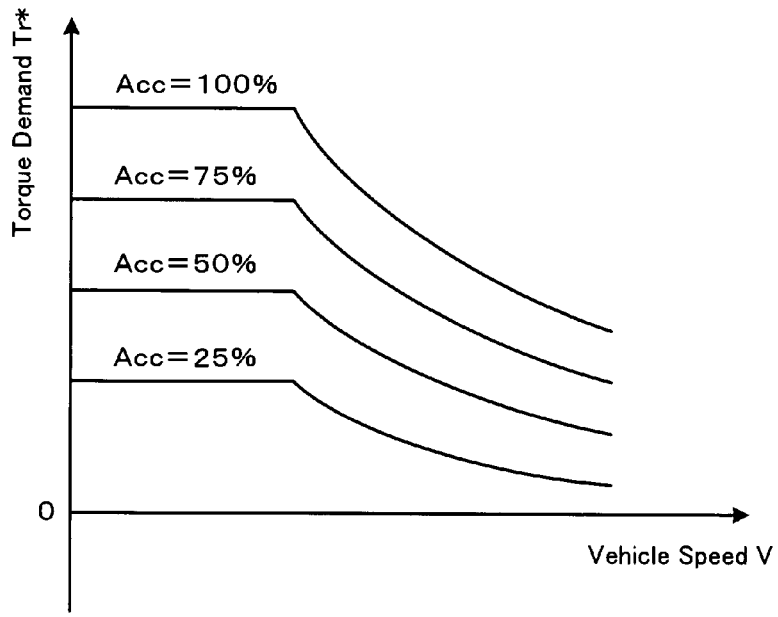
FIG. 7 shows one example of a torque demand setting map.

After the data input, the CPU 72 sets a torque demand Tr* to be output to the ring gear shaft 32$a$ or the driveshaft linked to the drive wheels 39$a$ and 39$b$ as a torque required for the hybrid vehicle 20 and an engine power demand Pe* to be output from the engine 22, based on the input accelerator opening Acc and the input vehicle speed V (step S110). A concrete procedure of setting the torque demand Tr* in this embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from this torque demand setting map. One example of the torque demand setting map is shown in FIG. 7. The engine power demand Pe* is calculated as the sum of the product of the torque demand Tr* and a rotation speed Nr of the ring gear shaft 32$a$, the battery electric power demand Pb* to be charged into or discharged from the battery 50, and a potential loss. The rotation speed Nr of the ring gear shaft 32$a$ is obtained by multiplying the vehicle speed V by a preset conversion factor k or by dividing the rotation speed Nm2 of the motor MG2 by a gear ratio Gr of the transmission 60.

Figure 8:
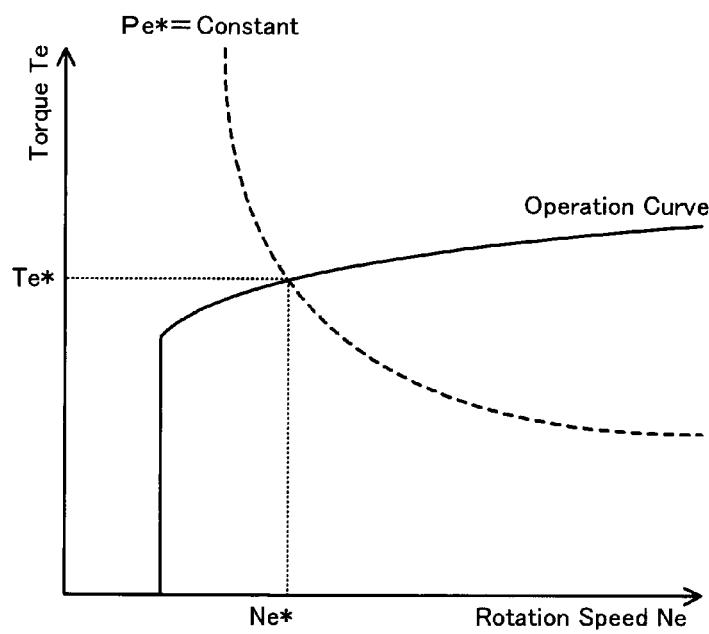
FIG. 8 shows an operation curve of an engine to set a target rotation speed Ne* and a target torque Te*.

The CPU 72 subsequently sets a target rotation speed Ne* and a target torque Te* of the engine 22 corresponding to the engine power demand Pe* (step S120). The target rotation speed Ne* and the target torque Te* of the engine 22 are determined according to an operation curve of ensuring efficient operations of the engine 22 and a curve of the engine power demand Pe*. FIG. 8 shows one example of the operation curve of the engine 22 to set the target rotation speed Ne* and the target torque Te*. As clearly shown in FIG. 8, the target rotation speed Ne* and the target torque Te* are given as an intersection of the operation curve and a curve of constant engine power demand Pe* (=Ne*×Te*).

The CPU 72 calculates a target rotation speed Nm1* of the motor MG1 from the target rotation speed Ne* of the engine 22, the rotation speed Nr (=Nm2/Gr) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S130):

$$Nm1^* = Ne^* \cdot (1+\rho)/\rho - Nm2/(Gr \cdot \rho) \quad (1)$$

$$Tm1^* = \text{Previous } Tm1^* + k1(Nm1^* - Nm1) + k2 \cdot (Nm1^* - Nm1)dt \quad (2)$$

Figure 9:
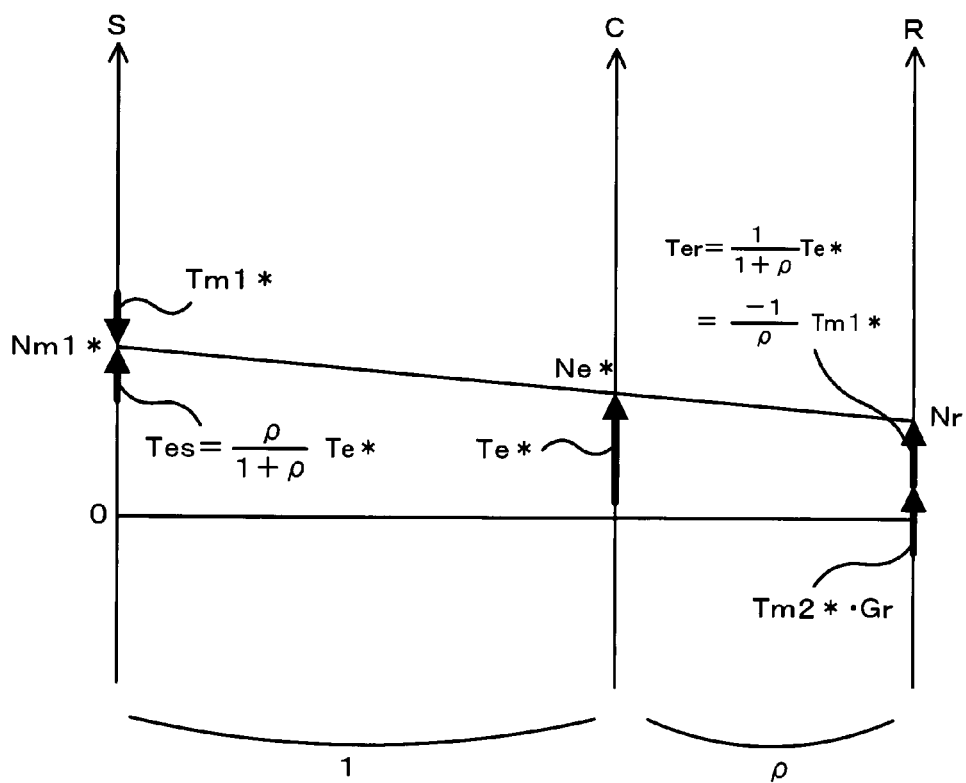
FIG. 9 is an alignment chart showing torque-rotation speed dynamics of respective rotational elements of a power distribution integration mechanism included in the hybrid vehicle of the embodiment.

Equation (1) is a dynamic relational expression of the rotational elements included in the power distribution integration mechanism 30. FIG. 9 is an alignment chart showing torque-rotation speed dynamics of the respective rotational elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 obtained by multiplying the rotation speed Nm2 of the motor MG2 by the gear ratio Gr of the transmission 60. Equation (1) is readily introduced from the alignment chart of FIG. 9. Two upward thick arrows on the axis 'R' in FIG. 9 respectively show a torque that is transmitted to the ring gear shaft 32a when the torque Te* is output from the engine 22 in steady operation at a specific drive point of the target rotation speed Ne* and the target torque Te*, and a torque that is applied to the ring gear shaft 32a via the transmission 60 when a torque Tm2* is output from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

After calculation of the target rotation speed Nm1* and the torque command Tm1* of the motor MG1, the CPU 72 calculates an upper torque restriction Tmax and a lower torque restriction Tmin as maximum and minimum torques that may be output from the motor MG2, according to Equations (3) and (4) given below (step S140):

$$Tmax = (Wout - Tm1^* \cdot Nm1)/Nm2 \quad (3)$$

$$Tmin = (Win - Tm1^* \cdot Nm1)/Nm2 \quad (4)$$

The upper torque restriction Tmax is given by dividing a difference between the output limit Wout of the battery 50 and the power consumption (power generation) of the motor MG1, which is the product of the torque command Tm1* and the input current rotation speed Nm1 of the motor MG1, by the input current rotation speed Nm2 of the motor MG2. The lower torque restriction Tmin is given by dividing a difference between the input limit Win of the battery 50 and power consumption (power generation) of the motor MG1 by the input current rotation speed Nm2 of the motor MG2. The CPU 72 then calculates a tentative motor torque Tm2tmp to be output from the motor MG2 from the torque demand Tr*, the torque command Tm1* of the motor MG1, and the gear ratio ρ of the power distribution integration mechanism 30 according to Equation (5) given below (step S150):

$$Tm2tmp = (Tr^* + Tm1^*/\rho)/Gr \quad (5)$$

The CPU 72 limits the tentative motor torque Tm2tmp to the range between the calculated upper torque restriction Tmax and lower torque restriction Tmin to set a torque command Tm2* of the motor MG2 (step S160). Setting the torque command Tm2* of the motor MG2 in this manner restricts the torque demand Tr* to be output to the ring gear shaft 32a or the driveshaft within the range of the input limit Win and the output limit Wout of the battery 50. Equation (5) is readily introduced from the alignment chart of FIG. 9.

After setting the torque command Tm2* of the motor MG2, the CPU 72 determines whether a torque change request is given to change the torque of the motor MG2 (step S170). The torque change request is output by a series of gearshift processing executed to attain a gearshift of the transmission 60. No torque change request is given in the state of no gearshift of the transmission 60 or in the state of a gearshift of the transmission 60 without any requirement for the torque change of the motor MG2. In the absence of the torque change request (step S170: No), the CPU 72 immediately sends the target rotation speed Ne* and the target torque Te* of the engine 22 to the engine ECU 24 and the torque commands Tm1* and Tm2* of the motors MG1 and MG2 to the motor ECU 40 (step S290) and terminates the drive control routine. The engine ECU 24 receives the settings of the target rotation speed Ne* and the target torque Te* and performs fuel injection control and ignition control of the engine 22 to drive the engine 22 at a specified drive point of the target rotation speed Ne* and the target torque Te*. The motor ECU 40 receives the settings of the torque commands Tm1* and Tm2* and performs switching control of switching elements included in the respective inverters 41 and 42 to drive the motor MG1 with the torque command Tm1* and the motor MG2 with the torque command Tm2*.

Figure 10:
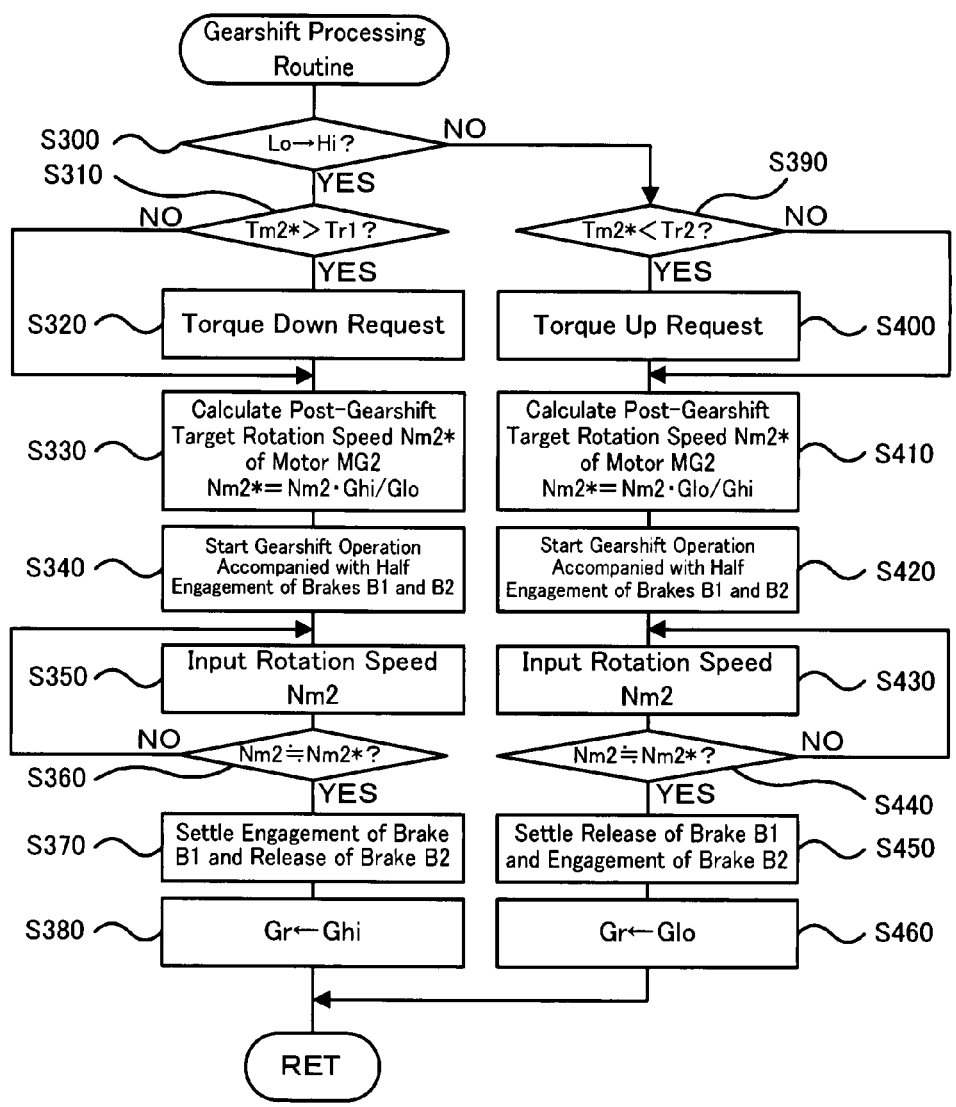
FIG. 10 is a flowchart showing a gearshift processing routine executed by the hybrid electronic control unit.

In the presence of the torque change request (step S170: yes), on the other hand, the CPU 72 inputs a change torque demand Trq to be changed (step S180) and resets the torque command Tm2* of the motor MG2 to the input change torque demand Trq (step S190). The change torque demand Trq is set equal to either an upper torque limit Tr1 or a lower torque limit Tr2 of the motor MG2 for a smooth gearshift of the transmission 60 by a gearshift processing routine shown in the flowchart of FIG. 10. The series of operation control to attain a gearshift of the transmission 60 is described briefly with reference to the gearshift processing routine of FIG. 10.

The gearshift processing routine first identifies the gearshift direction of the transmission 60 (step S300). At a gearshift from the Lo gear position to the Hi gear position, the torque command Tm2* of the motor MG2 is compared with the upper torque limit Tr1, which is set as a torque level of ensuring a smooth gearshift from the Lo gear position to the Hi gear position (step S310). When the torque command Tm2* of the motor MG2 is greater than the upper torque limit Tr1 (step S310: yes), a torque down request is output as the torque change request to reduce the torque command Tm2* of the motor MG2 to the upper torque limit Tr1 (step S320).

Namely the change torque demand Trq is set equal to the upper torque limit Tr1. When the torque command Tm2* of the motor MG2 is not greater than the upper torque limit Tr1 (step S310: no) or after the torque down request is output as the torque change request (step S320), the CPU 72 calculates a post-gearshift target rotation speed Nm2* of the motor MG2 from the current rotation speed Nm2 of the motor MG2 and the gear ratios Glo and Ghi of the transmission 60 according to Equation (6) given below (step S330):

$$Nm2^* = Nm2 \cdot Ghi/Glo \qquad (6)$$

Figure 11:
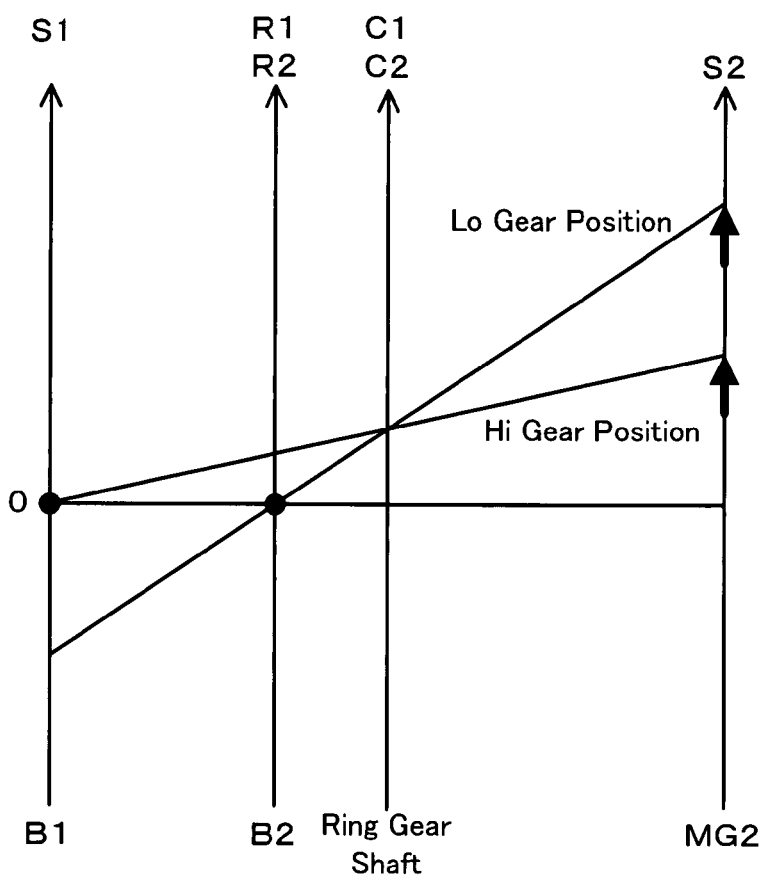
FIG. 11 is an alignment chart of the transmission.

The CPU 72 subsequently starts a gearshift operation accompanied with half engagement of the brakes B1 and B2 (step S340) and waits for a sufficient approach of the current rotation speed Nm2 of the motor MG2 to the calculated post-gearshift target rotation speed Nm2* (steps S350 and S360) When the current rotation speed Nm2 has sufficiently approached to the post-gearshift target rotation speed Nm2* (step S360: yes), the CPU 72 completely engages the brake B1 and completely releases the brake B2 (step S370). The CPU 72 then sets the gear ratio Ghi of the Hi gear position to the gear ratio Gr of the transmission 60 used for the drive control (step S380) and exits from this gearshift processing routine. FIG. 11 shows an alignment chart of the transmission 60. The axis 'S1' represents the rotation speed of the sun gear 61 in the double-pinion planetary gear mechanism 60a. The axis 'R1, R2' represents the rotation speed of the ring gear 62 in the double-pinion planetary gear mechanism 60a and the rotation speed of the ring gear 66 in the single-pinion planetary gear mechanism 60b. The axis 'C1, C2' represents the rotation speed of the carrier 64 in the double-pinion planetary gear mechanism 60a and the rotation speed of the carrier 68 in the single-pinion planetary gear mechanism 60b, which are equivalent to the rotation speed of the ring gear shaft 32a. The axis 'S2' represents the rotation speed of the sun gear 65 in the single-pinion planetary gear mechanism 60b, which is equivalent to the rotation speed of the motor MG2. As illustrated in the alignment chart of FIG. 11, at the Lo gear position, the brake B2 is engaged, while the brake B1 is released. The release of the brake B2 from the Lo gear position separates the motor MG2 from the ring gear shaft 32a. The frictional engagement of the brake B1 reduces the rotation speed Nm2 of the motor MG2. The motor MG2, however, increases its rotation speed in the motor functioning condition. An excessively large torque of the motor MG2 may thus cause significant wear of the brake B1 or may lead to a failure in decreasing the rotation speed Nm2 of the motor MG2. The gearshift processing routine of this embodiment accordingly requires the torque down. When the rotation speed Nm2 of the motor MG2 has sufficiently approached to the target rotation speed Nm2* at the Hi gear position, the state of the brake B1 is changed from the frictional engagement to the complete engagement. This completes the gearshift from the Lo gear position to the Hi gear position.

At a gearshift from the Hi gear position to the Lo gear position, on the other hand, the torque command Tm2* of the motor MG2 is compared with the lower torque limit Tr2, which is set as a torque level of ensuring a smooth gearshift from the Hi gear position to the Lo gear position (step S390). When the torque command Tm2* of the motor MG2 is less than the lower torque limit Tr2 (step S390: yes), a torque up request is output as the torque change request to increase the torque command Tm2* of the motor MG2 to the lower torque limit Tr2 (step S400). Namely the change torque demand Trq is set equal to the lower torque limit Tr2. When the torque command Tm2* of the motor MG2 is not less than the lower torque limit Tr2 (step S390: no) or after the torque up request is output as the torque change request (step S400), the CPU 72 calculates the post-gearshift target rotation speed Nm2* of the motor MG2 from the current rotation speed Nm2 of the motor MG2 and the gear ratios Glo and Ghi of the transmission 60 according to Equation (7) given below (step S410):

$$Nm2^* = Nm2 \cdot Glo/Ghi \qquad (7)$$

The CPU 72 subsequently starts a gearshift operation accompanied with half engagement of the brakes B1 and B2 (step S420) and waits for a sufficient approach of the current rotation speed Nm2 of the motor MG2 to the calculated post-gearshift target rotation speed Nm2* (steps S430 and S440) When the current rotation speed Nm2 has sufficiently approached to the post-gearshift target rotation speed Nm2* (step S440: yes), the CPU 72 completely engages the brake B2 and completely releases the brake B1 (step S450). The CPU 72 then sets the gear ratio Glo of the Lo gear position to the gear ratio Gr of the transmission 60 used for the drive control (step S460) and exits from this gearshift processing routine. As illustrated in the alignment chart of FIG. 11, at the Hi gear position, the brake B1 is engaged, while the brake B2 is released. The release of the brake B1 from the Hi gear position separates the motor MG2 from the ring gear shaft 32a. The frictional engagement of the brake B2 increases the rotation speed Nm2 of the motor MG2. The motor MG2, however, decreases its rotation speed in the generator functioning condition. An excessively small torque (an excessively large negative torque) of the motor MG2 may thus cause significant wear of the brake B2 or may lead to a failure in increasing the rotation speed Nm2 of the motor MG2. The gearshift processing routine of this embodiment accordingly requires the torque up. When the rotation speed Nm2 of the motor MG2 has sufficiently approached to the target rotation speed Nm2* at the Lo gear position, the state of the brake B2 is changed from the frictional engagement to the complete engagement. This completes the gearshift from the Hi gear position to the Lo gear position.

Referring back to the drive control routine of FIGS. 3 and 4, the CPU 72 determines whether the change torque demand Trq input at step S180 is in the range of the lower torque restriction Tmin and the upper torque restriction Tmax (step S200). When the change torque demand Trq is in the range of the lower torque restriction Tmin and the upper torque restriction Tmax, it is determined that the operation of the motor MG2 with the torque command Tm2* reset to the change torque demand Trq is ensured within the input limit Win and the output limit Wout of the battery 50. The CPU 72 accordingly sends the respective setting values including the reset torque command Tm2* of the motor MG2 to the relevant engine ECU 24 and motor ECU 40 (step S290) and exits from the drive control routine.

When the change torque demand Trq is smaller than the lower torque restriction Tmin, the CPU 72 recalculates and resets the torque command Tm1* of the motor MG1 according to Equation (8) given below, in order to ensure that the operation of the motor MG2 with the torque command Tm2* reset to the change torque demand Trq is within the range of the input limit Win of the battery 50 (step S210):

$$Tm1^* = (Win - Trq \cdot Nm2)/Nm1 \qquad (8)$$

After confirmation that the rotation speed Ne of the engine 22 is not higher than the result of subtraction of a preset rotation speed α from the target rotation speed Ne* (step S220: no), the CPU 72 sends the respective setting values including the reset torque commands Tm1* and Tm2* of the motors MG1 and MG2 to the relevant engine ECU 24 and motor ECU 40 (step S290) and exits from the drive control routine. In this state, resetting the torque command Tm1* of the motor MG1 increases the rotation speed Ne of the engine 22. The confirmation that the rotation speed Ne of the engine 22 is not higher than the result of subtraction of the preset rotation speed α from the target rotation speed Ne* is required to prevent the rotation speed Ne of the engine 22 from increasing significantly over the target rotation speed Ne*.

When the rotation speed Ne of the engine 22 is higher than the result of subtraction of the preset rotation speed α from the target rotation speed Ne* (step S220: yes), on the other hand, the CPU 72 recalculates and resets the engine power demand Pe* according to Equation (9) given below by subtracting a specific power corresponding to the change of the torque command Tm2* of the motor MG2 from the previous engine power demand Pe* set in a previous cycle of this drive control routine (step S230):

$$Pe^* = \text{Previous } Pe^* - (T\text{min} - Trq) \cdot Nm2 \qquad (9)$$

The target torque Te* of the engine 22 is then reset by dividing the reset engine power demand Pe* by the rotation speed Ne of the engine 22 (step S240). The CPU 72 sends the respective setting values including the reset torque commands Tm1* and Tm2* of the motors MG1 and MG2, the reset engine power demand Pe*, and the reset target torque Te* of the engine 22 to the relevant engine ECU 24 and motor ECU 40 (step S290) and exits from the drive control routine. The decrease of the engine power demand Pe* effectively prevents an abrupt increase in rotation speed Ne of the engine 22 even when the motor MG1 is driven with the torque command Tm1* reset to a smaller value.

When the change torque demand Trq is greater than the upper torque restriction Tmax, the CPU 72 recalculates and resets the torque command Tm1* of the motor MG1 according to Equation (10) given below, in order to ensure that the operation of the motor MG2 with the torque command Tm2* reset to the change torque demand Trq is within the range of the output limit Wout of the battery 50 (step S250):

$$Tm1^* = (Wout - Trq \cdot Nm2)/Nm1 \qquad (10)$$

After confirmation that the rotation speed Ne of the engine 22 is not lower than the result of addition of the preset rotation speed α to the target rotation speed Ne* (step S260: no), the CPU 72 sends the respective setting values including the reset torque commands Tm1* and Tm2* of the motors MG1 and MG2 to the relevant engine ECU 24 and motor ECU 40 (step S290) and exits from the drive control routine. In this state, resetting the torque command Tm1* of the motor MG1 decreases the rotation speed Ne of the engine 22. The confirmation that the rotation speed Ne of the engine 22 is not lower than the result of addition of the preset rotation speed α to the target rotation speed Ne* is required to prevent the rotation speed Ne of the engine 22 from decreasing significantly below the target rotation speed Ne*.

When the rotation speed Ne of the engine 22 is lower than the result of addition of the preset rotation speed α to the target rotation speed Ne* (step S260: yes), on the other hand, the CPU 72 recalculates and resets the engine power demand Pe* according to Equation (11) given below by adding a specific power corresponding to the change of the torque command Tm2* of the motor MG2 to the previous engine power demand Pe* set in a previous cycle of this drive control routine (step S270)

$$Pe^* = \text{Previous } Pe^* + (T\text{max} - Trq) \cdot Nm2 \qquad (11)$$

The target torque Te* of the engine 22 is then reset by dividing the reset engine power demand Pe* by the rotation speed Ne of the engine 22 (step S280). The CPU 72 sends the respective setting values including the reset torque commands Tm1* and Tm2* of the motors MG1 and MG2, the reset engine power demand Pe*, and the reset target torque Te* of the engine 22 to the relevant engine ECU 24 and motor ECU 40 (step S290) and exits from the drive control routine. The increase of the engine power demand Pe* effectively prevents an abrupt decrease in rotation speed Ne of the engine 22 even when the motor MG1 is driven with the torque command Tm1* reset to a greater value.

Figure 12:
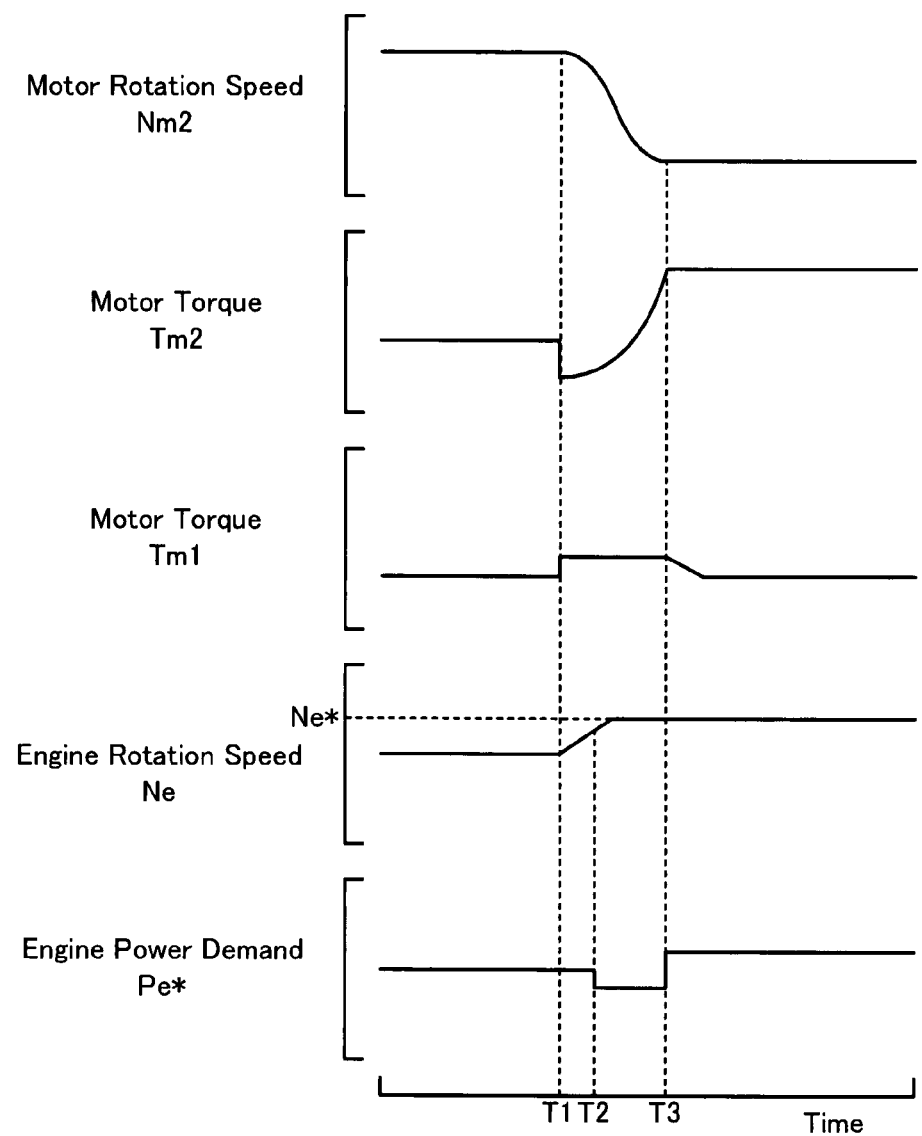
FIG. 12 is a time chart showing time variations in rotation speed Nm2 and torque Tm2 of a motor MG2, torque Tm1 of a motor MG1, rotation speed Ne of the engine, and engine power demand Pe* in response to a torque change request at a gearshift timing of the transmission from an Lo gear position to an Hi gear position.

FIG. 12 is a time chart showing time variations of the rotation speed Nm2 and the torque Tm2 of the motor MG2, the torque Tm1 of the motor MG1, the rotation speed Ne of the engine 22, and the engine power demand Pe* in response to a torque change request at a gearshift timing of the transmission 60 from the Lo gear position to the Hi gear position. On a start of a gearshift operation of the transmission 60 at a time point T1, the torque correction is made to decrease the torque Tm2 of the motor MG2 and to increase the torque Tm1 of the motor MG1 (steps S190 and S210). This torque correction increases the rotation speed Ne of the engine 22. At a time point T2 when the rotation speed Ne of the engine 22 reaches the result of subtraction of the preset rotation speed α from the target rotation speed Ne*, the engine power demand Pe* is decreased (step S230). The decreased engine power demand Pe* effectively prevents an abrupt increase in rotation speed Ne of the engine 22 and enables convergence of the rotation speed Ne to the target rotation speed Ne*. At a time point T3 when the gearshift operation of the transmission 60 is completed, the torque change request is removed to return the torque Tm2 of the motor MG2, the torque Tm1 of the motor MG1, and the engine power demand Pe* to the respective ordinary setting values. The time chart of FIG. 12 shows the time variations in response to a torque change request at the timing of a gearshift of the transmission 60 from the Lo gear position to the Hi gear position. The motor torques Tm1 and Tm2, the motor rotation speed Nm2, the engine rotation speed Ne, and the engine power demand Pe* also have time variations in response to a torque change request at the timing of a gearshift of the transmission 60 from the Hi gear position to the Lo gear position.

As described above, when the torque change of the motor MG2 is unattainable within the range of the input limit Win and the output limit Wout of the battery 50 at a gearshift timing of the transmission 60 in the course of output of a torque equivalent to the torque demand Tr* to the ring gear shaft 32a or the driveshaft, the hybrid vehicle 20 of the embodiment resets the torque command Tm1* of the motor MG1. Such resetting of the torque command Tm1* enables the gearshift of the transmission 60 accompanied with the torque change of the motor MG2. This attains a smooth gearshift of the transmission 60. When the resetting of the torque command Tm1* of the motor MG1 is expected to increase the rotation speed Ne of the engine 22 significantly over the target rotation speed Ne* or to decrease the rotation speed Ne of the engine 22 significantly below the target rotation speed Ne*, the hybrid vehicle 20 of the embodiment resets the engine power demand Pe*. This arrangement effectively prevents an abrupt increase or an abrupt decrease of the rotation speed Ne of the engine 22, thus assuring smooth drive control after the gearshift of the transmission 60.

When the torque change of the motor MG2 is unattainable within the range of the input limit Win and the output limit Wout of the battery 50 at the timing of a gearshift of the transmission 60, the hybrid vehicle 20 of the embodiment resets the torque command Tm1* of the motor MG1 regardless of the direction of the torque change of the motor MG2 to a decreasing direction or to an increasing direction. One possible modification may reset the torque command Tm1* of the motor MG1 only when the torque change of the motor MG2 is directed to the decreasing direction.

The hybrid vehicle 20 of the embodiment resets the engine power demand Pe*, when the resetting of the torque command Tm1* of the motor MG1 is expected to increase the rotation speed Ne of the engine 22 significantly over the target rotation speed Ne* or to decrease the rotation speed Ne of the engine 22 significantly below the target rotation speed Ne*. One possible modification of the drive control may not reset the engine power demand Pe* even on such occasions.

In the hybrid vehicle 20 of the embodiment, at the timing of a gearshift of the transmission 60 from the Lo gear position to the Hi gear position, the toque down request is given to make the torque command Tm2* of the motor MG2 not greater than the upper torque limit Tr1, which is set as the torque level of ensuring the smooth gearshift from the Lo gear position to the Hi gear position. At the timing of a gearshift of the transmission 60 from the Hi gear position to the Lo gear position, on the other hand, the torque up request is given to make the torque command Tm2* of the motor MG2 not less than the lower torque limit Tr2, which is set as the torque level of ensuring the smooth gearshift from the Hi gear position to the Lo gear position. In one possible modification, no torque change request may be given at the timing of a gearshift of the transmission 60 from the Hi gear position to the Lo gear position. In another possible modification, at the timing of a gearshift of the transmission 60 from the Hi gear position to the Lo gear position, a torque change request may be given to make the torque command Tm2* of the motor MG2 not greater than the upper torque limit Tr1 set as the torque level of ensuring the smooth gearshift from the Lo gear position to the Hi gear position.

The hybrid vehicle 20 of the embodiment includes the multi-speed transmission 60 having the two different speeds or reduction gear ratios to allow a gearshift between the Lo gear position and the Hi gear position. The transmission 60 may be replaced by another multi-speed transmission having three or a greater number of different speeds or reduction gear ratios or by a continuously variable transmission.

Figure 13:
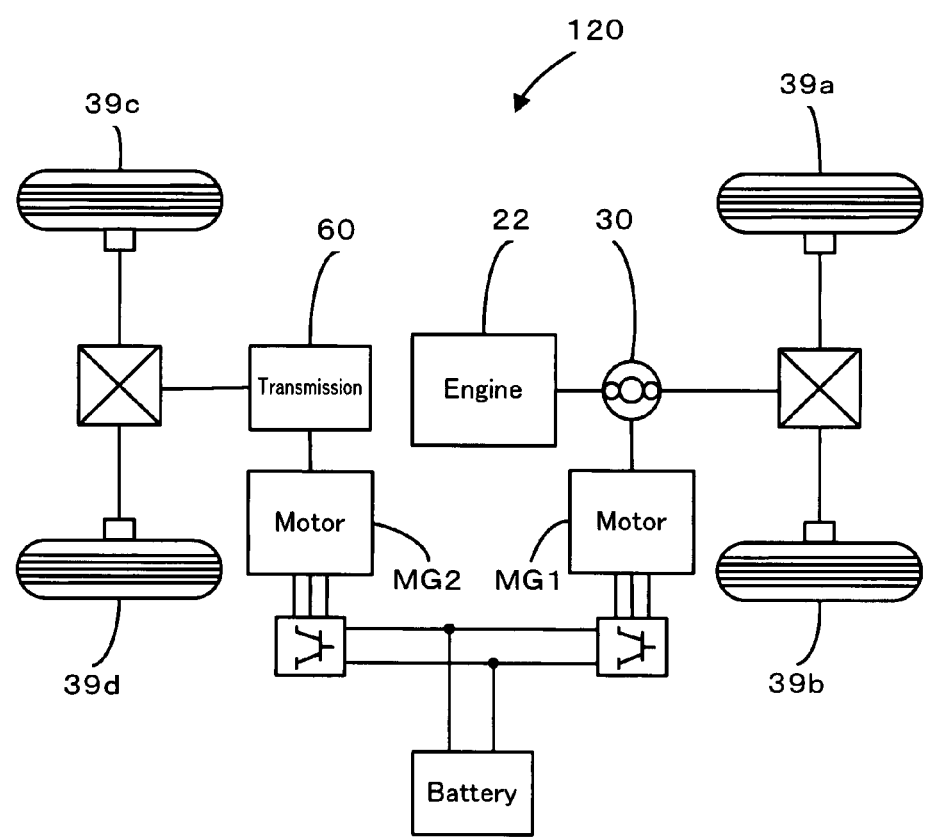
FIG. 13 schematically illustrates the configuration of another hybrid vehicle in one modified example.

In the hybrid vehicle 20 of the embodiment, the power of the motor MG2 is subjected to gear change by the transmission 60 and is output to the ring gear shaft 32a. In one possible modification shown as a hybrid vehicle 120 of FIG. 13, the power of the motor MG2 may be output to another axle (that is, an axle linked with drive wheels 39a and 39b), which is different from an axle connected with the ring gear shaft 32a (that is, an axle linked with the drive wheels 39c and 39d).

Figure 14:
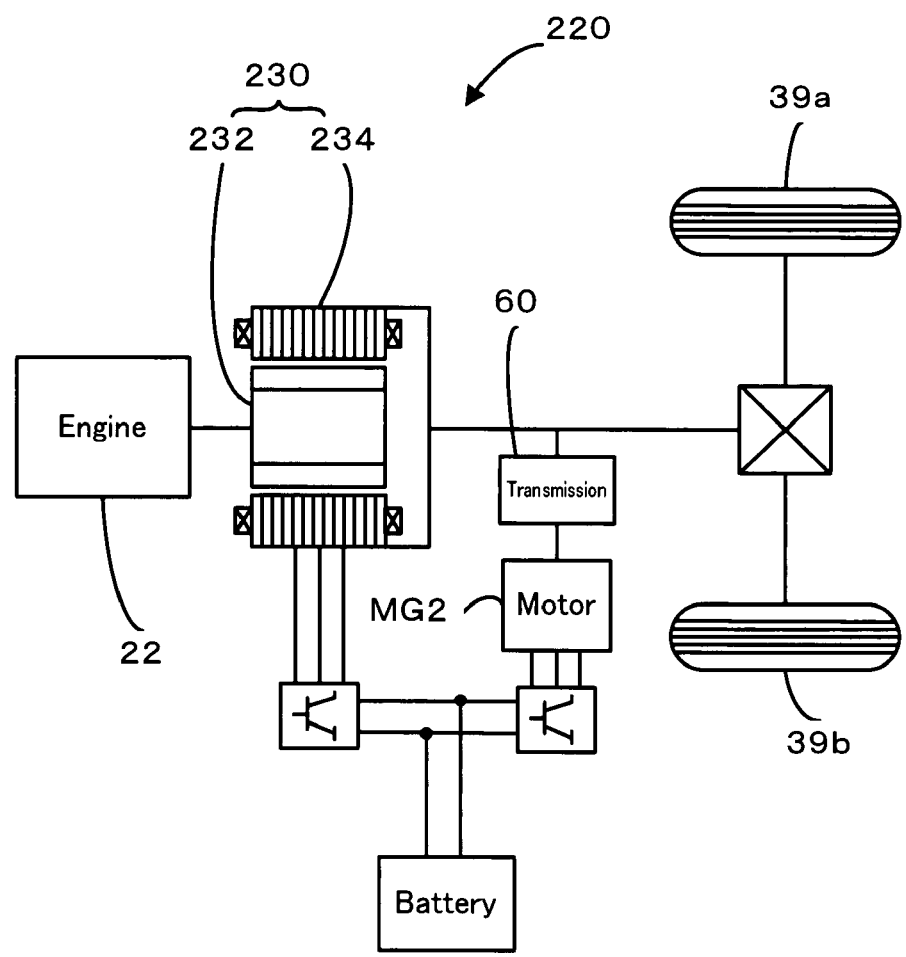
FIG. 14 schematically illustrates the configuration of still another hybrid vehicle in another modified example.

In the hybrid vehicle 20 of the embodiment, the power of the engine 22 is output via the power distribution integration mechanism 30 to the ring gear shaft 32a functioning as the drive shaft linked with the drive wheels 39a and 39b. In another possible modification of FIG. 14, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 39a, 39b and transmits part of the power output from the engine 22 to the drive shaft while converting the residual part of the power into electric power.

The power output apparatus of the embodiment includes the engine 22, the motors MG1 and MG2, the power distribution integration mechanism 30, and the transmission 60. The technique of the invention is, however, not restricted to the power output apparatus of this configuration, but is applicable to any configuration of a motor vehicle or a power output apparatus equipped with a transmission that allows a gearshift with a change of the motor torque.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the invention is preferably applied to the manufacturing industries of power output apparatuses and motor vehicles and other relevant industries.

The invention claimed is:

1. A power output apparatus that outputs power to a driveshaft, the power output apparatus comprising:
   an internal combustion engine;
   an electric power-mechanical power input output structure that is connected to an output shaft of the internal combustion engine and to the driveshaft and outputs at least part of output power of the internal combustion engine to the driveshaft through input and output of electric power and mechanical power;
   a motor that inputs and outputs power;
   a transmission mechanism that transmits power between a rotating shaft of the motor and the driveshaft with a changeover of a change gear ratio;
   an accumulator unit that inputs and outputs electric power from and to the electric power-mechanical power input output structure and the motor;
   a power demand setting module that sets a power demand to be output to the driveshaft; and
   a control module that attains the changeover of the change gear ratio of the transmission mechanism with corrective change of the output power of the motor,
      under a non-restricted change condition where the corrective change of the output power of the motor is attainable within an input limit and an output limit of the accumulator unit in the course of output of a certain power equivalent to the set power demand to the driveshaft, the control module controlling the internal combustion engine, the electric power-mechanical power input output structure, the motor, and the transmission mechanism to change over the change gear ratio of the transmission mechanism with correctively changing the output power of the motor and to ensure output of the certain power equivalent to the set power demand to the driveshaft,
      under a restricted change condition where the corrective change of the output power of the motor is unattainable within the input limit and the output limit of the accumulator unit in the course of output of the certain power equivalent to the set power demand to the driveshaft, the control module adjusting the input and the output of electric power by the electric power-mechanical power input output structure and controlling the internal combustion engine, the electric power-mechanical power input output structure, the motor, and the transmission mechanism to change over the change gear ratio of the transmission mechanism with correctively changing the output power of the motor within the input limit and the output limit of the accumulator unit and to ensure output of the certain power equivalent to the set power demand to the driveshaft.

2. The power output apparatus in accordance with claim 1, the power output apparatus further having:

a target mechanical power setting module that sets a target mechanical power to be output from the internal combustion engine, based on the set power demand, wherein under the non-restricted change condition, the control module controls the internal combustion engine to output a specific mechanical power equivalent to the set target mechanical power, and under the restricted change condition, the control module controls the internal combustion engine to output an adjusted mechanical power with a corrective change of the set target mechanical power to be within the input limit and the output limit of the accumulator unit.

3. The power output apparatus in accordance with claim 2, wherein under the restricted change condition, the control module controls the internal combustion engine with a change in torque.

4. The power output apparatus in accordance with claim 2, wherein under the restricted change condition, the control module controls the internal combustion engine with a change in rotation speed.

5. The power output apparatus in accordance with claim 1, the power output apparatus further having:

a target power setting module that sets a target power to be output from the internal combustion engine, based on the set power demand, wherein under the non-restricted change condition, the control module controls the internal combustion engine to output a specific power equivalent to the set target power, and under the restricted change condition, the control module controls the internal combustion engine to output an adjusted power equivalent to the set target power within the input limit and the output limit of the accumulator unit, accompanied with a change in rotation speed of the internal combustion engine.

6. The power output apparatus in accordance with claim 5, wherein under the restricted change condition, before a rotation speed of the internal combustion engine approaches to and reaches a target rotation speed determined according to the set target power, the control module controls the internal combustion engine to output the adjusted power equivalent to the set target power within the input limit and the output limit of the accumulator unit, accompanied with a change in rotation speed of the internal combustion engine, after the rotation speed of the internal combustion engine reaches the target rotation speed determined according to the set target power, the control module updating the set target power to be within the input limit and the output limit of the accumulator and controlling the internal combustion engine to output a corrective power equivalent to the updated target power.

7. The power output apparatus in accordance with claim 1, wherein the control module controls the electric power-mechanical power input output structure to decrease a torque toward a value '0', when the corrective change of the output power of the motor under the restricted change condition is correction of a torque of the motor toward a value '0'.

8. The power output apparatus in accordance with claim 7, wherein the control module controls the internal combustion engine with an increase in rotation speed, when the corrective change of the output power of the motor under the restricted change condition is correction of the torque of the motor toward the value '0'.

9. The power output apparatus in accordance with claim 1, wherein the transmission mechanism is a multi-speed transmission having at least two different reduction gear ratios as speeds.

10. The power output apparatus in accordance with claim 1, wherein the electric power-mechanical power input output structure has: a three shaft-type power input output mechanism that is linked to three shafts, the output shaft of the internal combustion engine, the driveshaft, and a third shaft, and inputs and outputs power from and to a residual one shaft based on powers input from and output to any two shafts among the three shafts; and a generator that inputs and outputs power from and to the third shaft.

11. The power output apparatus in accordance with claim 1, wherein the electric power-mechanical power input output structure has a pair-rotor motor that has a first rotor connected to the output shaft of the internal combustion engine and a second rotor connected to the driveshaft and is driven to output at least part of the output power of the internal combustion engine to the driveshaft through input and output of electric power by electromagnetic interaction of the first rotor with the second rotor.

12. A motor vehicle that is equipped with a power output apparatus that outputs power to a driveshaft and has an axle linked with the driveshaft, said motor vehicle comprising:

an internal combustion engine;

an electric power-mechanical power input output structure that is connected to an output shaft of the internal combustion engine and to the driveshaft and outputs at least part of output power of the internal combustion engine to the driveshaft through input and output of electric power and mechanical power;

a motor that inputs and outputs power;

a transmission mechanism that transmits power between a rotating shaft of the motor and the driveshaft with a changeover of a change gear ratio;

an accumulator unit that inputs and outputs electric power from and to the electric power-mechanical power input output structure and the motor;

a power demand setting module that sets a power demand to be output to the driveshaft; and a control module that attains the changeover of the change gear ratio of the transmission mechanism with corrective change of the output power of the motor, under a non-restricted change condition where the corrective change of the output power of the motor is attainable within an input limit and an output limit of the accumulator unit in the course of output of a certain power equivalent to the set power demand to the driveshaft, the control module controlling the internal combustion engine, the electric power-mechanical power input output structure, the motor, and the transmission mechanism to change over the change gear ratio of the transmission mechanism with correctively changing the output power of the motor and to ensure output of the certain power equivalent to the set power demand to the driveshaft, under a restricted change condition where the corrective change of the output power of the motor is unattainable within the input limit and the output limit of the accumulator unit in the course of output of the certain power equivalent to the set power demand to the driveshaft, the control module adjusting the input and the output of electric power by the electric power-mechanical power input output structure and controlling the internal combustion engine, the electric power-mechanical power input output structure, the motor, and the transmission mechanism to change over the change gear ratio of the transmission mechanism with correctively changing the output power of the motor within the input limit and the output limit of the accumulator unit and to ensure output of the certain power equivalent to the set power demand to the driveshaft.

13. A control system for a power output apparatus, the power output apparatus having: an internal combustion engine; an electric power-mechanical power input output structure that is connected to an output shaft of the internal combustion engine and to a driveshaft and outputs at least part of output power of the internal combustion engine to the driveshaft through input and output of electric power and mechanical power; a motor that inputs and outputs power; a transmission mechanism that transmits power between a rotating shaft of the motor and the driveshaft with a changeover of a change gear ratio; and an accumulator unit that inputs and outputs electric power from and to the electric power-mechanical power input output structure and the motor, the control system comprising:

a power demand setting module that sets a power demand to be output to the driveshaft; and a control module that attains the changeover of the change gear ratio of the transmission mechanism with corrective change of the output power of the motor, under a non-restricted change condition where the corrective change of the output power of the motor is attainable within an input limit and an output limit of the accumulator unit in the course of output of a certain power equivalent to the set power demand to the driveshaft, the control module controlling the internal combustion engine, the electric power-mechanical power input output structure, the motor, and the transmission mechanism to change over the change gear ratio of the transmission mechanism with correctively changing the output power of the motor and to ensure output of the certain power equivalent to the set power demand to the driveshaft, under a restricted change condition where the corrective change of the output power of the motor is unattainable within the input limit and the output limit of the accumulator unit in the course of output of the certain power equivalent to the set power demand to the driveshaft, the control module adjusting the input and the output of electric power by the electric power-mechanical power input output structure and controlling the internal combustion engine, the electric power-mechanical power input output structure, the motor, and the transmission mechanism to change over the change gear ratio of the transmission mechanism with correctively changing the output power of the motor within the input limit and the output limit of the accumulator unit and to ensure output of the certain power equivalent to the set power demand to the driveshaft.

14. A control method of a power output apparatus, the power output apparatus having: an internal combustion engine; an electric power-mechanical power input output structure that is connected to an output shaft of the internal combustion engine and to a driveshaft and outputs at least part of output power of the internal combustion engine to the driveshaft through input and output of electric power and mechanical power; a motor that inputs and outputs power; a transmission mechanism that transmits power between a rotating shaft of the motor and the driveshaft with a changeover of a change gear ratio; and an accumulator unit that inputs and outputs electric power from and to the electric power-mechanical power input output structure and the motor, the control method attaining the changeover of the change gear ratio of the transmission mechanism with corrective change of the output power of the motor, under a non-restricted change condition where the corrective change of the output power of the motor is attainable within an input limit and an output limit of the accumulator unit in the course of output of a certain power equivalent to a power demand, which is required for the driveshaft, to the driveshaft, the control method controlling the internal combustion engine, the electric power-mechanical power input output structure, the motor, and the transmission mechanism to change over the change gear ratio of the transmission mechanism with correctively changing the output power of the motor and to ensure output of the certain power equivalent to the power demand to the driveshaft, under a restricted change condition where the corrective change of the output power of the motor is unattainable within the input limit and the output limit of the accumulator unit in the course of output of the certain power equivalent to the power demand to the driveshaft, the control method adjusting the input and the output of electric power by the electric power-mechanical power input output structure and controlling the internal combustion engine, the electric power-mechanical power input output structure, the motor, and the transmission mechanism to change over the change gear ratio of the transmission mechanism with correctively changing the output power of the motor within the input limit and the output limit of the accumulator unit and to ensure output of the certain power equivalent to the power demand to the driveshaft.

* * * * *